United States Patent [19]
Larkin et al.

[11] Patent Number: 6,073,262
[45] Date of Patent: Jun. 6, 2000

[54] METHOD AND APPARATUS FOR ESTIMATING AN ACTUAL MAGNITUDE OF A PHYSICAL PARAMETER ON THE BASIS OF THREE OR MORE REDUNDANT SIGNALS

[75] Inventors: Louis J. Larkin, Lake Clarke Shores; Timothy A. Healy; Laura J. Kerr, both of Jupiter, all of Fla.

[73] Assignee: United Technologies Corporation, Hartford, Conn.

[21] Appl. No.: 08/867,702

[22] Filed: May 30, 1997

[51] Int. Cl.[7] ............................................... G06F 11/00
[52] U.S. Cl. ............................................ 714/736; 714/786
[58] Field of Search ....................... 701/27, 144, 57, 701/106, 4, 11, 117; 702/181, 199; 706/45; 376/245; 60/39.281; 73/116; 714/2, 6, 25, 26, 31, 33, 48, 723, 736, 737, 786, 794, 797, 819

[56] References Cited

U.S. PATENT DOCUMENTS

| | | | |
|---|---|---|---|
| 4,423,594 | 1/1984 | Ellis | 60/39.281 |
| 4,641,517 | 2/1987 | Spock et al. | 73/116 |
| 4,772,445 | 9/1988 | Nasrallah et al. | 376/245 |
| 4,914,598 | 4/1990 | Krogmann et al. | 701/11 |
| 5,233,542 | 8/1993 | Hohner et al. | 702/199 |
| 5,285,380 | 2/1994 | Payton | 364/174 |
| 5,351,200 | 9/1994 | Impink, Jr. | 702/181 |
| 5,357,436 | 10/1994 | Chiu | 701/117 |
| 5,481,648 | 1/1996 | Volponi et al. | 706/45 |
| 5,566,092 | 10/1996 | Wang et al. | 364/551.02 |
| 5,631,830 | 5/1997 | Schroeder | 701/4 |

*Primary Examiner*—Meng-Ai T. An
*Assistant Examiner*—Nabil El-Hady

[57] ABSTRACT

An apparatus includes at least three redundant signals each indicative of a sensed magnitude of a parameter. Parity space and fuzzy logic techniques may be used to provide a signal representing an estimate of the actual magnitude of the parameter. A method for generating an estimate of an actual magnitude of a parameter provides at least three redundant signals may use parity space and fuzzy logic to produce a signal representing an estimate of the actual magnitude of the parameter.

36 Claims, 8 Drawing Sheets

FIG.6

| RULE # | | CONDITION PORTION | | | | | | CONSEQUENT PORTION |
|---|---|---|---|---|---|---|---|---|
| 1 | IF | (DIFF$_{12}$ is SMALL) | AND | (DIFF$_{1M}$ is SMALL) | AND | (DIFF$_{2M}$ is SMALL) | THEN USE | AVERAGE (S1, S2) |
| 2 | IF | (DIFF$_{12}$ is SMALL) | AND | (DIFF$_{1M}$ is SMALL) | AND | (DIFF$_{2M}$ is MEDIUM) | THEN USE | AVERAGE (S1, S2) |
| 3 | IF | (DIFF$_{12}$ is SMALL) | AND | (DIFF$_{1M}$ is SMALL) | AND | (DIFF$_{2M}$ is LARGE) | THEN USE | AVERAGE (S1, S2) |
| 4 | IF | (DIFF$_{12}$ is SMALL) | AND | (DIFF$_{1M}$ is MEDIUM) | AND | (DIFF$_{2M}$ is SMALL) | THEN USE | AVERAGE (S1, S2) |
| 5 | IF | (DIFF$_{12}$ is SMALL) | AND | (DIFF$_{1M}$ is MEDIUM) | AND | (DIFF$_{2M}$ is MEDIUM) | THEN USE | AVERAGE (S1, S2) |
| 6 | IF | (DIFF$_{12}$ is SMALL) | AND | (DIFF$_{1M}$ is MEDIUM) | AND | (DIFF$_{2M}$ is LARGE) | THEN USE | AVERAGE (S1, S2) |
| 7 | IF | (DIFF$_{12}$ is SMALL) | AND | (DIFF$_{1M}$ is LARGE) | AND | (DIFF$_{2M}$ is SMALL) | THEN USE | AVERAGE (S1, S2) |
| 8 | IF | (DIFF$_{12}$ is SMALL) | AND | (DIFF$_{1M}$ is LARGE) | AND | (DIFF$_{2M}$ is MEDIUM) | THEN USE | AVERAGE (S1, S2) |
| 9 | IF | (DIFF$_{12}$ is SMALL) | AND | (DIFF$_{1M}$ is LARGE) | AND | (DIFF$_{2M}$ is LARGE) | THEN USE | AVERAGE (S1, S2) |
| 10 | IF | (DIFF$_{12}$ is MEDIUM) | AND | (DIFF$_{1M}$ is SMALL) | AND | (DIFF$_{2M}$ is SMALL) | THEN USE | AVERAGE (S1, S2) |
| 11 | IF | (DIFF$_{12}$ is MEDIUM) | AND | (DIFF$_{1M}$ is SMALL) | AND | (DIFF$_{2M}$ is MEDIUM) | THEN USE | AVERAGE (S1, S2, MODEL) |
| 12 | IF | (DIFF$_{12}$ is MEDIUM) | AND | (DIFF$_{1M}$ is SMALL) | AND | (DIFF$_{2M}$ is LARGE) | THEN USE | AVERAGE (S1, MODEL) |
| 13 | IF | (DIFF$_{12}$ is MEDIUM) | AND | (DIFF$_{1M}$ is MEDIUM) | AND | (DIFF$_{2M}$ is SMALL) | THEN USE | AVERAGE (S1, S2, MODEL) |
| 14 | IF | (DIFF$_{12}$ is MEDIUM) | AND | (DIFF$_{1M}$ is MEDIUM) | AND | (DIFF$_{2M}$ is MEDIUM) | THEN USE | AVERAGE (S1, S2, MODEL) |
| 15 | IF | (DIFF$_{12}$ is MEDIUM) | AND | (DIFF$_{1M}$ is MEDIUM) | AND | (DIFF$_{2M}$ is LARGE) | THEN USE | AVERAGE (S1, S2, MODEL) |
| 16 | IF | (DIFF$_{12}$ is MEDIUM) | AND | (DIFF$_{1M}$ is LARGE) | AND | (DIFF$_{2M}$ is SMALL) | THEN USE | AVERAGE (S2, MODEL) |
| 17 | IF | (DIFF$_{12}$ is MEDIUM) | AND | (DIFF$_{1M}$ is LARGE) | AND | (DIFF$_{2M}$ is MEDIUM) | THEN USE | AVERAGE (S1, S2, MODEL) |
| 18 | IF | (DIFF$_{12}$ is MEDIUM) | AND | (DIFF$_{1M}$ is LARGE) | AND | (DIFF$_{2M}$ is LARGE) | THEN USE | AVERAGE (S1, S2) |
| 19 | IF | (DIFF$_{12}$ is LARGE) | AND | (DIFF$_{1M}$ is SMALL) | AND | (DIFF$_{2M}$ is SMALL) | THEN USE | MODEL |
| 20 | IF | (DIFF$_{12}$ is LARGE) | AND | (DIFF$_{1M}$ is SMALL) | AND | (DIFF$_{2M}$ is MEDIUM) | THEN USE | AVERAGE (S1, MODEL) |
| 21 | IF | (DIFF$_{12}$ is LARGE) | AND | (DIFF$_{1M}$ is SMALL) | AND | (DIFF$_{2M}$ is LARGE) | THEN USE | AVERAGE (S1, MODEL) |
| 22 | IF | (DIFF$_{12}$ is LARGE) | AND | (DIFF$_{1M}$ is MEDIUM) | AND | (DIFF$_{2M}$ is SMALL) | THEN USE | AVERAGE (S1, S2, MODEL) |
| 23 | IF | (DIFF$_{12}$ is LARGE) | AND | (DIFF$_{1M}$ is MEDIUM) | AND | (DIFF$_{2M}$ is MEDIUM) | THEN USE | MODEL |
| 24 | IF | (DIFF$_{12}$ is LARGE) | AND | (DIFF$_{1M}$ is MEDIUM) | AND | (DIFF$_{2M}$ is LARGE) | THEN USE | AVERAGE (S1, MODEL) |
| 25 | IF | (DIFF$_{12}$ is LARGE) | AND | (DIFF$_{1M}$ is LARGE) | AND | (DIFF$_{2M}$ is SMALL) | THEN USE | AVERAGE (S2, MODEL) |
| 26 | IF | (DIFF$_{12}$ is LARGE) | AND | (DIFF$_{1M}$ is LARGE) | AND | (DIFF$_{2M}$ is MEDIUM) | THEN USE | AVERAGE (S2, MODEL) |
| 27 | IF | (DIFF$_{12}$ is LARGE) | AND | (DIFF$_{1M}$ is LARGE) | AND | (DIFF$_{2M}$ is LARGE) | THEN USE | MODEL |

METHOD AND APPARATUS FOR ESTIMATING AN ACTUAL MAGNITUDE OF A PHYSICAL PARAMETER ON THE BASIS OF THREE OR MORE REDUNDANT SIGNALS

DESCRIPTION

1. Technical Field

This invention relates to systems having redundant signals and more particularly to a method and apparatus for evaluating three or more redundant signals each indicative of a sensed magnitude of a parameter so as to provide a better estimate of the actual magnitude of the parameter.

2. Background Art

Many systems employ redundancy to preserve system functionality should a particular component fail. Often however, redundancy by itself is not sufficient, and the system must have the ability to "detect", e.g., recognize the occurrence ot, "isolate", e.g., identify the source of, and "accommodate", e.g., respond to, the failure (fault). For some faults, detection and isolation are one and the same. Processors can fail memory checks. Servo valves can reveal shorts or opens via current checks.

However, some other categories of faults are more difficult to detect, isolate, and accommodate. For example, modern gas turbine aircraft engines are frequently equipped with a pair of sensors (transducers) for each parameter, e.g., each temperature, to be measured. Each sensor produces a signal indicative of the magnitude of the sensed parameter. Due to measurement inaccuracies, the indicated magnitude can deviate from the true (actual) magnitude of the parameter. The amount of this deviation (error) depends in part on the condition, i.e. state or health, of the sensor. If the sensed magnitudes for a parameter agree, i.e. are relatively close to one another, then it is generally assumed that both sensors are healthy, and either one may be used as an estimate of the actual magnitude. Alternatively, an estimate may be produced by averaging the two magnitudes. However, if the sensed magnitudes do not agree, one or both sensors may have failed. To produce the best estimate of the actual magnitude of the parameter, it is desirable to detect and isolate such fault. Some sensor faults can be detected and isolated by comparing each sensor signal to an expected range and an expected rate of change, but if both sensors pass these checks yet disagree, another approach is needed.

Various other approaches for detecting, isolating, and accommodating sensor faults presently exist, although none provide optimum results. One such approach uses knowledge of the most likely failure modes for that type of sensor and attempts to determine whether one sensor is more likely than the other to have failed. However, this approach is not determinative with regard to all types of sensors.

Another approach compares the potential consequences of selecting each one of the sensor magnitudes as the estimate of the actual magnitude, should the selected sensor be the erroneous one. The sensor magnitude having the least hazardous potential consequences is selected, i.e. select "safe". For example, the consequences of picking an erroneously low magnitude engine speed signal may include catastrophically overspeeding the engine. The consequences of picking an erroneously high magnitude signal are usually limited to an engine performance loss due to unnecessarily limiting engine speed. By this logic, the obvious choice for a select "safe" strategy is to choose the high signal. This strategy falls apart however, if the magnitude of the speed error is large enough. Such an error can result in engine shutdown, a highly undesirable result for a single engine aircraft—especially in flight.

A more effective approach incorporates an on-board model that provides an analytical third sensor to help detect and isolate sensor faults. For example, recent advances in the technology of modeling gas turbine engines have produced accurate, real-time engine models which are suitable for incorporation in the engine control system's embedded software. (See Kerr, L. J., Nemec T. S., and Gallops G. W., 1992, "Real-time Estimation of Gas Turbine Engine Damage Using a Control Based Kalman Filter Algorithm," Journal of Engineering for Gas Turbines and Power, vol. 114, no. 2, pp. 187–195.) The actual magnitude of the parameter may be estimated by any one of a number of techniques such as mean of the three sensors, median of the three sensors, or mean of the two non modeled sensors.

With three sensors, fault detection and isolation may be accomplished by a parity space method that examines the relative differences between each of the three sensed magnitudes. (See Patton, R. J., and Chen, J., 1992, "Review Of Parity Space Approaches To Fault Diagnosis Applicable To Aerospace Systems," Proc. AIAA Guidance, Navigation And Control Conference, AIAA-92-4538.) However, in a traditional parity space implementation, the system compares the relative difference information to a fault threshold and characterizes the health of each sensor as either valid or faulty. Thus, if one sensor disagrees with the others, but the relative differences do not exceed the fault threshold, the sensor is considered valid. On the other hand, if the relative differences become large enough that the fault threshold is exceeded, the sensor is considered faulty. Sensors characterized as valid are used to estimate the actual magnitude of the parameter. Sensors characterized as faulty are not used in the estimation. Shortcomings arise with this implementation. First, the fault threshold must be large enough to preclude false fault indications, yet until the fault threshold is exceeded, the system responds to a marginally functional sensor as if it is valid, potentially introducing large errors into the estimation of the actual magnitude. Second, a rapid and potentially large transition in the estimated actual magnitude occurs upon isolation of a faulty sensor.

In U.S. Pat. No. 5,351,200 to Impink, a process facility has three redundant sensors to sense a temperature magnitude and a multi-valued logic variable to indicate the truth or falsehood of a condition regarding the temperature magnitude, such as for example, the temperature is greater than 400 degrees Fahrenheit (deg F). The multi-valued logic variable is assigned a value on the basis of the redundant sensor readings wherein truth is indicated by a value of +1.0, and falsehood is indicated by a value of −1.0. Values in between +1.0 and −1.0 are used to indicate that the redundant sensors do not agree or there is some other reason to doubt the quality of the data. Thus, if two of the three sensors indicate 410 deg F and the other indicates 380 deg F, the multi-valued logic variable may be assigned a value of +0.7 instead of +1.0. Such a methodology is useful for indicating the presence of doubt in a characterization of the truth or falsehood of a condition, however, it is not useful for estimating the actual magnitude of the parameter sensed by the redundant sensors. Therefore, an improved method and apparatus for evaluating redundant sensors is sought so as to enable better fault detection and accommodation and therein to provide better estimation of the actual magnitude of the parameter.

DISCLOSURE OF THE INVENTION

An object of the present invention is to provide a method and an apparatus for evaluating three or more redundant input signals each indicative of a sensed magnitude of a parameter that provides a more accurate estimate of the actual magnitude of the parameter in the event that one or more of the sensors is not completely healthy.

To overcome the problems described above, an apparatus for use in estimating an actual magnitude of a physical parameter includes a differencer which receives at least three redundant input signals each indicative of a sensed magnitude of the parameter and provides at least three difference signals indicative of the relative differences between the sensed magnitudes, and further includes an evaluator for computing a plurality of evaluation signals in response to the difference signals, and further includes a synthesizer for generating an estimate signal indicative of an estimate of the actual magnitude of the physical parameter in responsive to the evaluation signals.

In a second aspect of the present invention a method for use in estimating an actual magnitude of a physical parameter includes providing at least three difference signals each indicative of the relative differences between the sensed magnitudes of at least three redundant input signals, and further includes computing a plurality of evaluation signals in response to the difference signals, and further includes generating an estimate signal indicative of an estimate of the actual magnitude of the physical parameter in responsive to said evaluation signals.

In a third aspect of the present invention, an engine control system for use in operating a gas turbine engine, includes a sensor array of at least three sensors for providing at least three redundant input signals corresponding to the value of an engine parameter, and further includes an estimator apparatus having apparatus for providing, in response to the redundant input signals at least three difference signals indicative of the relative differences between the respective sensor signal values, the estimator apparatus further having apparatus for computing a plurality of evaluation signals in response to the difference signals and apparatus for generating an estimate signal in response to the evaluation signals indicative of an estimate of the actual magnitude of the parameter.

Unlike previous systems the method and the apparatus of the present invention do not simply characterize the health of each sensor as valid or faulty. Thus, the present invention has less tendency to track the faulted sensor than does the previous approach. As a result, it can minimize errors in the estimate and prevent large transients upon isolation of a faulty sensor. Reduced errors and transients present obvious benefits to a control system.

In the best mode embodiment each of the input signals has a magnitude indicative of the sensed magnitude of the parameter, and each of the signals indicative of the relative agreement is a difference signal having a magnitude indicative of the difference between the magnitude of two of the input signals. The magnitude of each of the difference signals may be proportional to the difference between the magnitude of two of the input signals. The method and apparatus may employ fuzzy logic including a fuzzifier, a fly inferencer, and a defuzzifier. The fuzzifier preferably includes a fuzzy rulebase comprising a plurality of fuzzy rules each having a consequent portion indicative of a crisp value. Each of the rules may have a condition portion that can be evaluated to determine a degree of fulfillment for said rule, and the estimate signal may have a magnitude that is computed as a degree of fulfillment weighted average of the consequent portions of the rules. The estimate signal is preferably stored in a lookup table.

In a fourth aspect of the present invention, an apparatus for evaluating redundant signals is prepared by a process that uses fuzzy logic to produce an output signal for each of a plurality of different input combinations and produces a mapping based on the plurality of combinations and the associated output signals. The mapping represents an input output relation that defines an estimate signal based upon the redundant signals.

In a fifth aspect of the present invention, a method for producing an apparatus for evaluating redundant signals uses fuzzy logic to produce an output signal for each of a plurality of different input combinations and produces a mapping based on the plurality of combinations and the associated output signals.

BRIEF DESCRIPTION OF THE DRAWINGS

FIG. 6 is a tabular representation of a fuzzy rulebase which may be used with the estimator of FIG. 4;

BEST MODE EMBODIMENT FOR CARRYING OUT THE INVENTION

Figure 1:
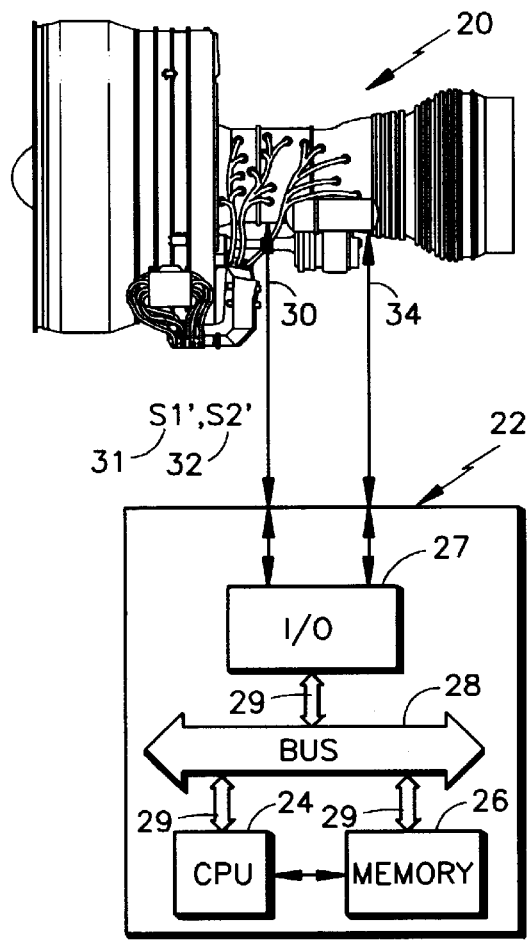
FIG. 1 is a simplified block diagram showing an aircraft engine and an engine control system in which the present invention may be used.

The present invention is directed to providing an improved method and apparatus for evaluating three or more redundant input signals each indicative of a sensed magnitude of a parameter so as to better estimate the actual magnitude of the parameter. To accomplish this, the present invention makes use of fry logic. Fuzzy logic concepts are well known (See Zadeh, L. A., 1973, "Outline of a new approach to the analysis of complex systems and decision processes," IEEE Trans. Syst. Man. Cybern., vol. SMC-3, no. 1, pp. 2844. and Zadeh, L. A., 1992, "The calculus of fuzzy if/then rules," AI Expert, March, pp. 23–27.).

Fuzzy logic techniques are normally employed in the nature of computer algorithms, executed through the use of computers with associated hardware. Fuzzy logic techniques have been applied primarily in the area of dynamic control systems, and to a lesser extent, in the area of decision making systems generally, e.g., elevator dispatch strategy. This is because many real world concepts are difficult to precisely characterize by Boolean (true or false) type variables. For example, a "warm" temperature, a "high" pressure, or a "slow" speed. Fuzzy logic systems are better suited to such characterization than are Boolean systems because fuzzy logic systems use multi-valued logic expressions instead of Boolean expressions. However, until now, fuzzy logic has not been employed to the problem of estimating the actual magnitude of a parameter on the basis of three or more redundant sensors.

Fuzzy logic systems typically represent the magnitude of a "real world" input variable as a "degree of membership" in each of a plurality of fuzzy sets, commonly referred to as "fuzzy membership functions". A real world input variable, or for that matter, any variable, value, or expression which does not employ fuzzy logic is commonly referred to as a "crisp" variable, "crisp" value, or "crisp" expression, all of which are generically referred to herein as "crisp" types. A fuzzy membership function is a correspondence that associates crisp input values with membership degree values. Membership functions are often assigned linguistic names such as "fast", "moderate", "slow". A crisp input value may have a degree of membership in two or more fuzzy membership functions at the same time, e.g. an engine speed may be concurrently somewhat "fast" yet somewhat "moderate" which may be expressed for example as "speed=35% fast, 45% moderate, 0% slow". This type of representation is commonly referred to as a "fuzzy variable"; and the step of converting a "real world" variable to a fuzzy variable is commonly referred to as "fizification". The use of fuzzy variables, enables a fuzzy system to provide a more precise characterization of the value of the "real world variable" than that provided by a Boolean system.

To be useful, a fuzzy logic system employs a plurality of fuzzy logic rules, collectively referred to as a "fuzzy rulebase". Fuzzy logic rules are similar to Boolean logic rules e.g., IF condition THEN consequence, except that they use fuzzy set theory rather then binary logic. In a step commonly referred to as "fuzzy inferencing", the condition portion of each rule is evaluated with respect to the fuzzy input variables to determine a "degree of fulfillment" for that rule. (Note that the condition may comprise a compound condition connected by a logical operator, for example, condition$_1$ AND condition$_2$ which is typically defined as the minimum of condition$_1$ and condition$_2$ or condition$_1$ OR condition$_2$ which is typically defined as the maximum of condition$_1$ and condition$_2$.) The consequence portion of each rule is traditionally in the form of degrees of membership in various membership functions comparable to, but not identical to, those used for "fuzzification", such as "output=40% high, 20% medium, 0% low". The results of the fuzzy inferencing are collectively referred to as a "fuzzy output" or "fuzzy output variable".

The fuzzy output variable is ultimately converted into a single "real world" numerical value, i.e. a crisp output, for output from the fuzzy logic system. This step, commonly referred to as "defuzzifcation", traditionally involves the use of a method such as either "mean of the maxima" or "centroid". By using fuzzy logic concepts, the present invention provides straightforward generation of multidimensional non-linear relationships between inputs and output(s), which would otherwise be difficult to visualize or create.

In some systems, the constituent parts of a fuzzy implementation are relatively obvious, e.g. if the temperature is hot then turn the fan on high. However, the constituent parts of a fuzzy system for use in estimating the actual magnitude of a parameter based on three or more redundant sensors are not obvious. This may be one reason that fuzzy logic has not previously been applied to this problem. For example, an appropriate form for consequent portion of the fuzzy rulebase and an appropriate method for performing "defuzzification", are not obvious to one of ordinary skill in the art. This is evidenced in part by the fact that the consequent portion of a fuzzy rule is traditionally in the form of degrees of membership in each of a set of membership functions (with linguistic names), yet with respect to this problem, a crisp value is preferred for the consequent portion as described below. The preferred method for detoxification is thus also non traditional, because traditional defuzzification methods are adapted to defuzzify traditional type consequent portions.

The present invention is disclosed with respect to a best mode embodiment for use with a gas turbine aircraft engine and control system illustrated in FIG. 1. Referring now to FIG. 1, a gas turbine aircraft engine 20 is controlled by an engine controller 22, commonly referred to as a "FADEC" for full authority digital engine control, having a central processing unit 24, a memory section 26, an input/output (I/O) section 27, and a bus 28 with connections 29 to each of the elements of the controller 22. The engine controller 22 is electrically connected to the engine 20 by way of a plurality of signal lines 30 through which the controller 22 receives signals that provide data on various engine parameters, such as temperature, pressure, rpm, etc. With regard to many parameters, the data is redundant, being provided by a pair of signals, for example S1' 31 and S2' 32 for one particular parameter. Another plurality of signal lines 34 are used to transmit signals from the controller 22 to various actuators in the engine 20.

Figure 2:
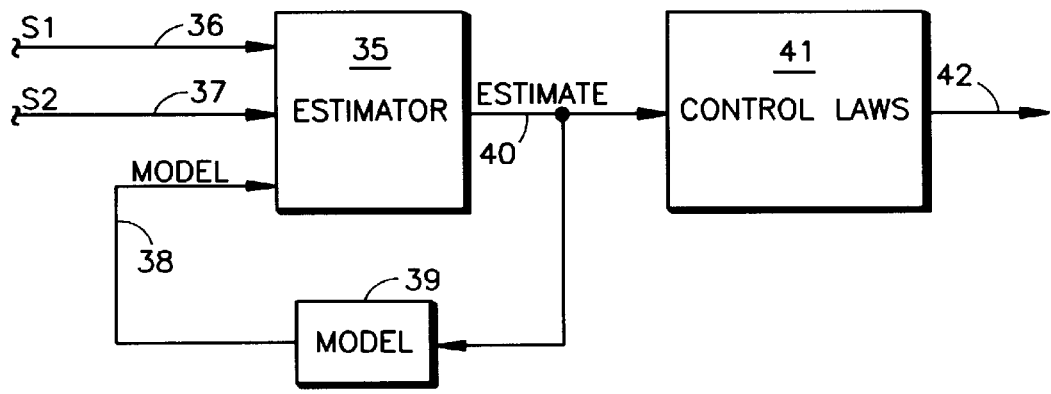
FIG. 2 is a simplified functional block diagram showing an estimator of the present invention embodied in a program within the controller of FIG. 1.

An engine control program stored in the memory section 26 directs the controller 22 to monitor the signals on the signals lines 30 and initiate appropriate actions in the engine 20 via signals on the signal lines 34. Referring now to FIG. 2, the engine control program functionally includes an estimator 35 that receives redundant digital signals S1, S2 on signal lines 36, 37. S1 has a magnitude that represents the parameter magnitude, preferably in engineering units, indicated by signal S1' 31 (FIG. 1). Similarly, S2 has a magnitude that represents the parameter magnitude indicated by signal S2' 32 (FIG. 1). The estimator 35 receives a third digital signal, MODEL, on a signal line 38 from a model 39 serving as an analytical third sensor. The MODEL signal has a magnitude that represents the parameter magnitude as determined by the model 39.

The estimator 35 responds to the S1, S2, MODEL signals in a manner described hereinbelow to produce an output signal, ESTIMATE, representing an estimate of the actual magnitude of the parameter. The ESTIMATE signal is input via signal line 40 to a control laws portion 41 that implements and may also be input (fed back) to the real time model 39. The control laws portion 41 provides an output signal on signal line 42 that is used in determining the appropriate action to be initiated by the controller 22 (FIG. 1) in the engine 20 (FIG. 1).

Those skilled in the art will recognize that although the disclosed embodiment of the estimator is in programmed hardware, i.e. executed in software by a computer, it may take other forms, including hardwired hardware configurations, hardware manufactured in integrated circuit form, firmware, and combinations therein.

Figure 3:
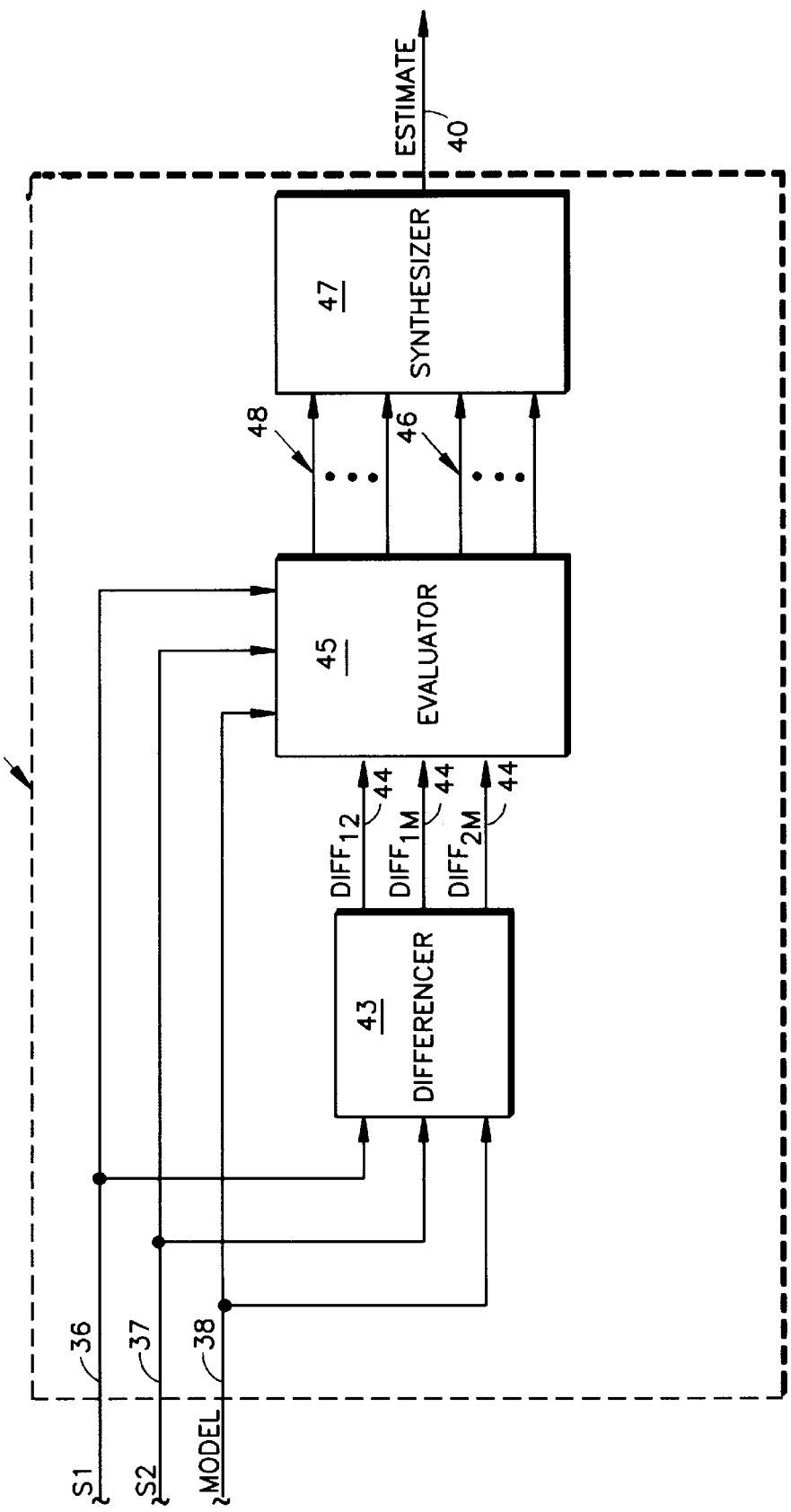
FIG. 3 is simplified functional block diagram of a first embodiment of the estimator of FIG. 2.

Referring now to FIG. 3, a first embodiment of the estimator 35 of FIG. 2 detects and accommodates disagreements between the sensor signals. The estimator 35 may comprise a differencer 43 that receives the three input signals S1, S2, MODEL, and outputs three difference (parity space) signals $DIFF_{12}$, $DIFF_{1M}$, $DIFF_{2M}$, on a plurality of lines 44. The differencer 43 preferably functions as an absolute value subtractor such that each of the difference signals $DIFF_{12}$, $DIFF_{1M}$, $DIFF_{2M}$, is equal to the absolute value of the magnitude difference between two of the input signals, i.e., $DIFF_{12}$=ABS(S1−S2), $DIFF_{1M}$=ABS(S1−MODEL), $DIFF_{2M}$=ABS(S2−MODEL). Absolute values may be used because the estimator preferably accounts for a faulty sensor, but it is typically not important whether it is faulty high or faulty low. However, the differencer 43 may be of any type suitably adapted to provide difference signals $DIFF_{12}$, $DIFF_{1M}$, $DIFF_{2M}$ that are suitably indicative of the relative differences between the magnitudes of the input signals S1, S2, MODEL, including but not limited to a ratio of the magnitudes (e.g., $DIFF_{12}$=S1/S2), a percentage difference between the magnitudes (e.g., $DIFF_{12}$=((S1−S2)/S1)×100%), and combinations thereof.

The three difference signals $DIFF_{12}$, $DIFF_{1M}$, $DIFF_{2M}$ are received on lines 44 by an evaluator 45. The evaluator 45 evaluates the difference signals and produces a plurality of evaluation signals that are provided via a plurality of signal lines 46 to a synthesizer 47. The magnitudes of the evaluation signals may be indicative of any significant disagreement between the sensed parameter magnitudes. The evaluator 45 may further receive the S1, S2, and MODEL input signals via signal lines 36, 37, 38, and output a second plurality of signals to the synthesizer 47 on a second plurality of signal lines 48. The magnitudes of a second plurality of signals should be indicative of the sensed magnitudes of the input signals. The synthesizer 47 uses the information indicated by the evaluation signals and second plurality of signals to generate the ESTIMATE signal on line 40.

In one embodiment, each of the evaluation signals is of a nature similar to that of a weighting factor for a corresponding one of the second plurality of signals. Each one of the second plurality of signals may have a magnitude indicative of a possible estimate for the actual magnitude of the parameter, such as for example, a weighted combination of two or more of the sensed magnitudes (e.g., an average of S1, S2, MODEL) and the magnitude of the weighting factor may be indicative of the "level of relative confidence" (belief of relative accuracy) in the signal as an estimate of the actual magnitude of the sensed parameter. The synthesizer may accordingly compute the ESTIMATE signal as the weighted average of the second plurality of signals.

In another embodiment, the input signals may alternatively be input directly to the synthesizer 47 and each of the evaluation signals may be of a nature similar to that of a gain factor for a corresponding one of the input signals. In this embodiment, the evaluator is of a nature similar to a gain scheduler (or a transfer function). In such event the ESTIMATE signal may be provided at a magnitude equal to the summation of the product of the magnitude of each evaluation signal and its corresponding input signal. Of course, the ESTIMATE signal may alternatively be generated using any other suitable method known to those skilled in the art, including methods comprising combinations of the methods herein.

It will be understood that regardless of the embodiment used to generate the ESTIMATE signal, the magnitude of the ESTIMATE signal may be characterized as indicative of a summation of the product of each input signal magnitude and an associated proportionality constant, wherein each proportionality constant has a value equal to one of a plurality of possible values for that proportionality constant, the value of each proportionality constant depending upon said magnitudes of said difference signals. Where optimum failure accommodation results are desired, the possible values of the proportionality factors should range from substantially zero to substantially unity, and should be continuous or at least generally continuous, i.e. having incrementally increasing magnitudes separated by no more than about 0.01 to about 0.1. This helps to avoid large errors and transients in the ESTIMATE signal in the event of a sensor failure, such that the ESTIMATE signal may be considered "generally smooth", i.e., small changes in the sensed magnitudes generally result in a small change in the slope of the ESTIMATE signal.

Figure 4:
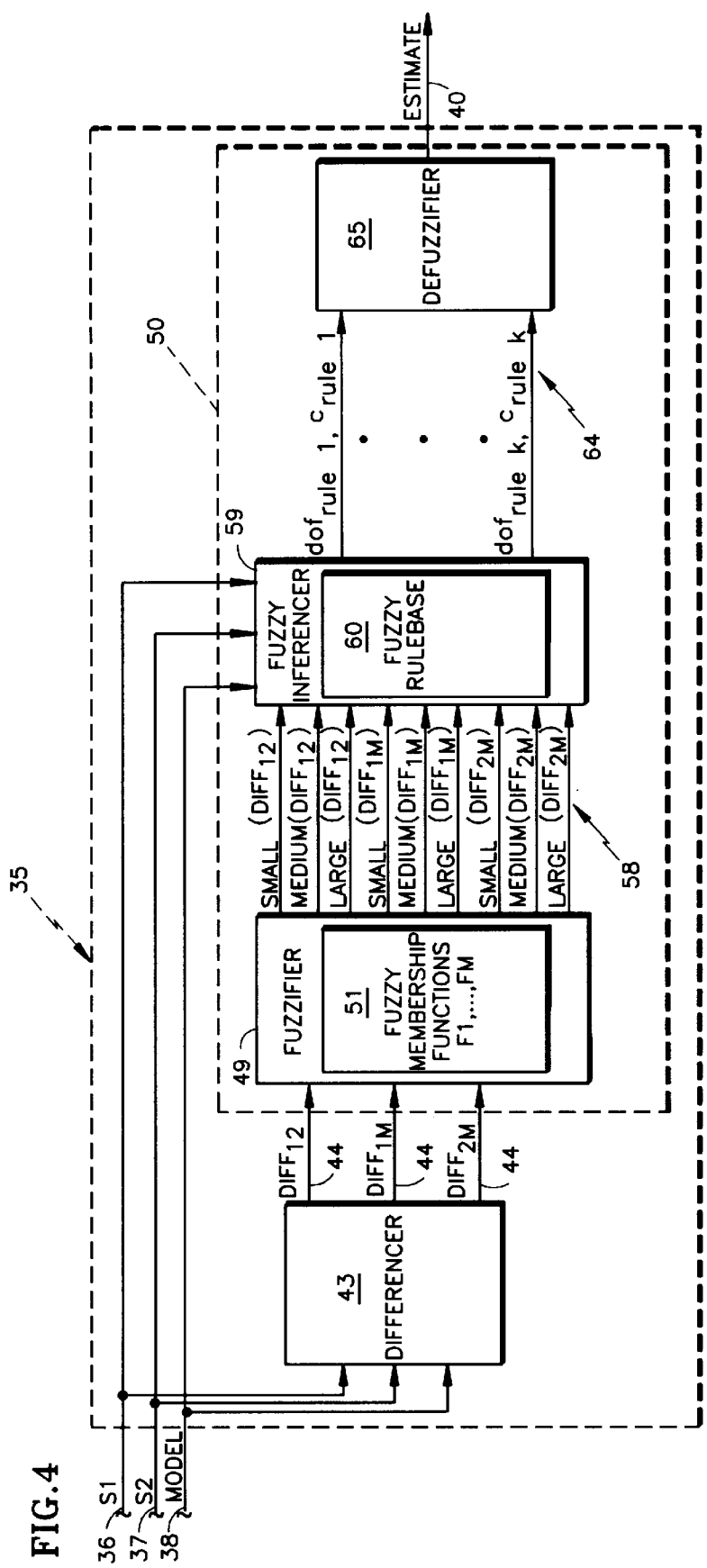
FIG. 4 is simplified functional block diagram of the estimator of FIG. 3 wherein the estimator comprises a fuzzy logic section.
Figure 5:
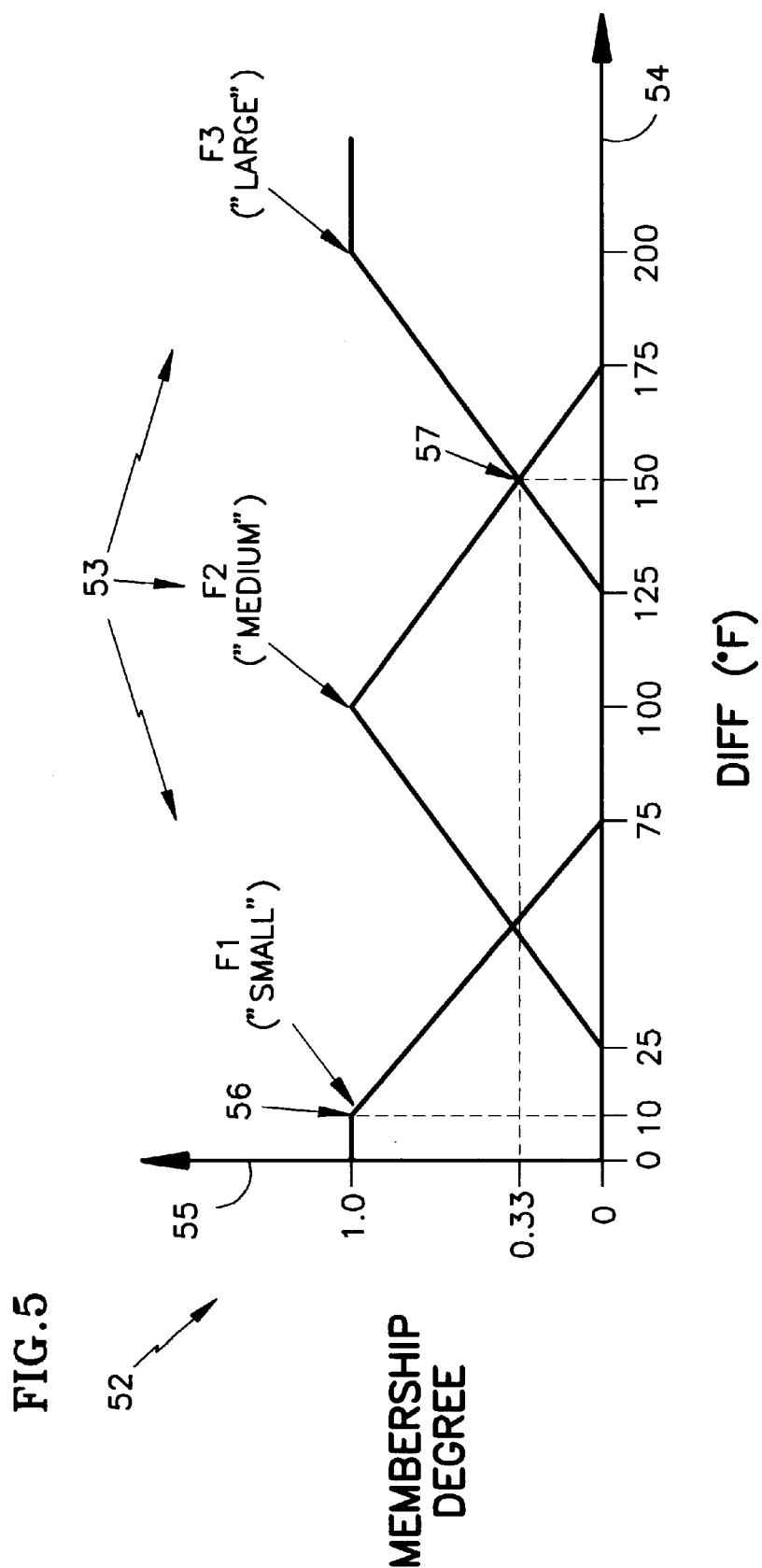
FIG. 5 is a graphical representation of fuzzy logic membership functions which may be used in estimator of FIG. 4.

Referring now to FIG. 4, the evaluator 45 (FIG. 3) and the synthesizer 47 (FIG. 3) may employ fuzzy logic. For example, the three difference signals $DIFF_{12}$, $DIFF_{1M}$, $DIFF_{2M}$ may be crisp inputs to a "fuzzier" (a portion of the estimator that provides fuzzification) 49 in a fuzzy logic section 50 of the estimator 35. The fuzzifier 49 converts ("fuzzifies") the crisp inputs to fuzzy inputs on the basis of a plurality of fuzzy membership functions 51. Referring now to FIG. 5, an exemplary set 52 of fuzzy membership functions 51 (FIG. 4) comprises three functions F1, F2, F3 53 each of which is a correspondence that associates crisp input values with membership degree values (illustrated here in a rectangular coordinate plane with crisp inputs values on one axis 54 and membership degree values on the other axis 55). Membership functions F1, F2, F3 have been assigned linguistic names "SMALL", "MEDIUM", and "LARGE", respectively.

The membership functions preferably accommodate the particular type of sensor in question, that sensor's most likely failure mode, and expected variability. The membership functions may have a triangular-like shape as shown or any other suitable shape including but not limited to sinusoidal-like. In order to tune the overall input/output response, each membership function may overlap every other membership function in the set by an amount greater than or less than that shown.

The fuzzifier 49 (FIG. 4) evaluates each membership function, i.e. SMALL, MEDIUM, LARGE, with respect to the crisp input, to obtain an associated membership degree value from that function. The membership degree values from the set of membership functions are collectively the fuzzy representation for the crisp input, and commonly referred to as fuzzy inputs. For example, given these membership functions, if the crisp input value is 10 deg F 56, the associated membership degree values are 1.0 for SMALL, 0.0 for MEDIUM, 0.0 for LARGE and the fuzzy inputs are 1.0, SMALL; 0.0, MEDIUM; 0.0, LARGE. Alternatively, if the crisp input value is 150 deg F 57, the associated membership degree values are 0.0 for SMALL, 0.33 for MEDIUM, 0.33 for LARGE, and the fuzzy inputs are 0.0, SMALL; 0.33, MEDIUM; 0.33, LARGE.

In this embodiment, each of the three crisp inputs for a particular parameter are fuzzified according to the same SMALL, MEDIUM, LARGE fuzzy membership functions. Thus, the fuzzy inputs for each of the three crisp inputs $DIFF_{12}$, $DIFF_{1M}$, $DIFF_{2M}$ may be respectively expressed as:

SMALL($DIFF_{12}$), MEDIUM($DIFF_{12}$), LARGE($DIFF_{12}$)

SMALL($DIFF_{1M}$), MEDIUM($DIFF_{1M}$), LARGE($DIFF_{1M}$)

SMALL($DIFF_{2M}$), MEDIUM($DIFF_{2M}$), LARGE($DIFF_{2M}$)

It should be recognized that if N represents the number (order) of crisp inputs and M represents the number (granularity) of membership functions for each crisp input, there are $N^M=(3)=27$ possible combinations of inputs comprising the fuzzy "possibility space" (See Kang, H. and Vachtsevanos, G., 1993 "Fuzzy Hypercubes: Linguistic Learning/Reasoning Systems for Intelligent Control and Identification," Journal of Intelligent and Robotic Systems, vol. 7, pp. 215–232.).

Referring again to FIG. 4, the fuzzifier 49 outputs signals representing the fuzzy inputs on a plurality of lines 58 to a "fuzzy inferencer" (a portion of the estimator that provides fuzzy inferencing) 59. The fuzzy inferencer 59 includes a fuzzy rulebase 60. Referring now to FIG. 6, an exemplary fuzzy rulebase 62 comprises rules of the form:

IF (condition) THEN consequence

The condition is evaluated with respect to the fuzzy inputs to determine a degree of fulfillment (dof) for the rule. The consequent portion represents an estimate of the actual magnitude of the parameter. For example, Rule #12 (63) in the rulebase states:

IF ($DIFF_{12}$ is MEDIUM) AND ($DIFF_{1M}$ is SMALL) AND ($DIFF_{2M}$ is LARGE) THEN USE AVERAGE (S1, MODEL)

The condition in this rule has three expressions or parts (corresponding with the number of crisp inputs) interconnected by AND operators. In order to determine the degree of fulfillment (dof) for the rule, each part is evaluated with respect to the fuzzy inputs to determine a degree of fulfillment for that part. Note that the degree of fulfillment for ($DIFF_{12}$ is MEDIUM is equal to the value of the fuzzy input from the MEDIUM membership function with respect to $DIFF_{12}$. i.e., MEDIUM($DIFF_{12}$). Similarly, the degrees of fulfillment for ($DIFF_{1M}$ is SMALL) and ($DIFF_{2M}$ is LARGE) are equal to SMALL($DIFF_{1M}$) and LARGE($DIFF_{2M}$) respectively. The degrees of fulfillment for the parts are ANDed together using the logical product (MINIMUM function) (See Schwartz D. G., Klir G. J., and Ezawa Y., 1994, "Applications of Fuzzy Sets and Approximate Reasoning," Proceedings of the IEEE, vol. 82, no. 4.) to determine the overall degree of fulfillment for the rule. Thus, if the degrees of fulfillment for the three expressions are 0.7, 0.3, 0.4, the overall degree of fulfillment (dof) for the rule is MIN(0.7,0.3,0.4)=0.3. So long as the membership degree values for the fuzzy membership functions are in the range of from 0.0 to 1.0, the overall degree of fulfillment will also have a value between 0.0 and 1.0.

The consequent portion of Rule 12 is the expression AVERAGE(S1,MODEL). An expression of this type is unusual for a consequent portion in that it represents a crisp value rather than a fuzzy value. This is because in this embodiment, an appropriate crisp value may be readily provided. In addition, the use of a crisp value reduces the complexity of the estimator by eliminating the need for another set of fuzzy membership functions.

The methodology embodied in the consequence portions of the exemplary rulebase 62 is to ignore the model value if S1 and S2 agree i.e., if $DIFF_{12}$ is SMALL. If S1 and S2 differ somewhat, e.g., if $DIFF_{12}$ is MEDIUM, the rulebase may use the model value in the estimation. If there is extensive disagreement, i.e., if $DIFF_{12}$ is LARGE, the rulebase uses the model value and knowledge of the sensors' most likely failure modes to determine an estimate. It should be noted that a methodology such as this would be quite difficult and/or impractical to implement without the present invention. It should be obvious that the makeup of a rulebase may depend on the expected accuracy of the particular model estimated parameter, the most likely failure mode of the sensor, and the relative consequences of an erroneously selected value.

The rulebase may have one rule for each input combination within the fuzzy "possibility space". However, depending upon the membership functions, some combinations may not be physically possible and therefore do not actually require a corresponding rule.

Referring again to FIG. 4, the fuzzy inferencer 59 evaluates each rule in the fuzzy rulebase 60 with respect to the fuzzy inputs to determine the degree of fulfillment (dof) for that rule. Collectively, the degrees of fulfillment (dof) and the associated consequent portions constitute a set of fuzzy outputs.

The fuzzy inferencer 59 provides signals representing the fuzzy outputs on a plurality 64 of lines to a "defuzzifier" (a portion of the estimator that provides defuzzification) 65. The defuzzifier 65 converts (defuzzifies) the fuzzy outputs to a crisp value that represents the estimate of the actual magnitude of the parameter. The estimate is preferably computed according to the following formula:

$$\text{estimate} = (\Sigma c_i * dof_i)/\Sigma dof_i$$

where $dof_i$ and $c_i$ are the respective degree of fulfillment and consequent portion of the ith rule. This method of a computation may be referred to as the degree of fulfillment weighted average of the rulebase consequent portions. It differs from the "mean of maxima" method summarized by Filev et al. (See Filev, D. P., and Yager, R. R., 1991, "A generalized defuzzification via BAD distributions," Int. J. Intell. Syst., vol. 6, pp. 687–697.) in that it uses the consequent portion of the $i^{th}$ rule instead of a maxima of a fuzzy membership function. Such a method is possible because the consequent portions of the exemplary rulebase already represent crisp values. The boundedness of this method, as with most defuzzification methods, is guaranteed because the result is a weighted average of the inputs. The defuzzifier outputs the ESTIMATE signal. The overall input/output response of the estimator is preferably somewhat smooth and monatomic.

Figure 7:
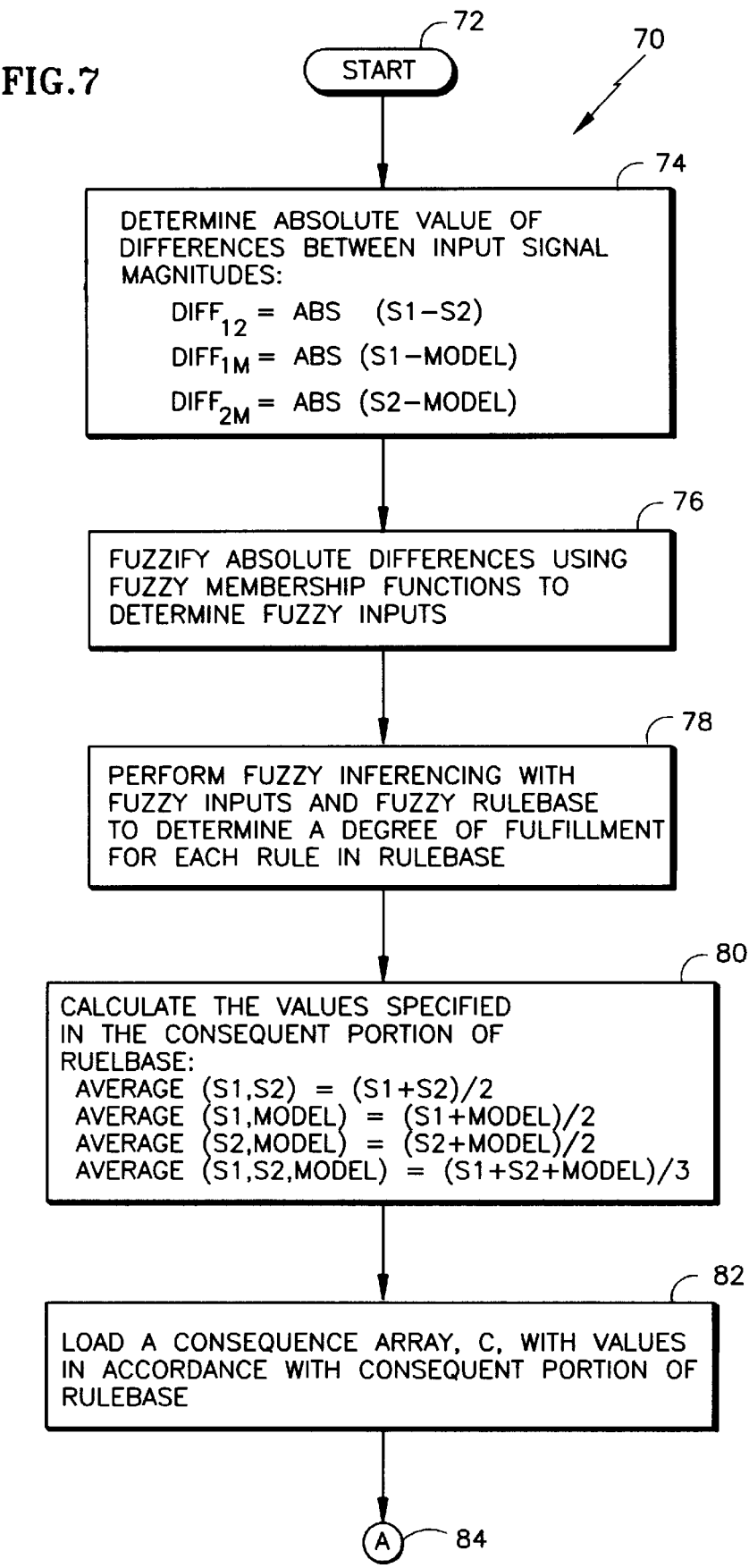
FIGS. 7, 8 are a simplified flowchart of the estimator of FIG. 4.
Figure 8:
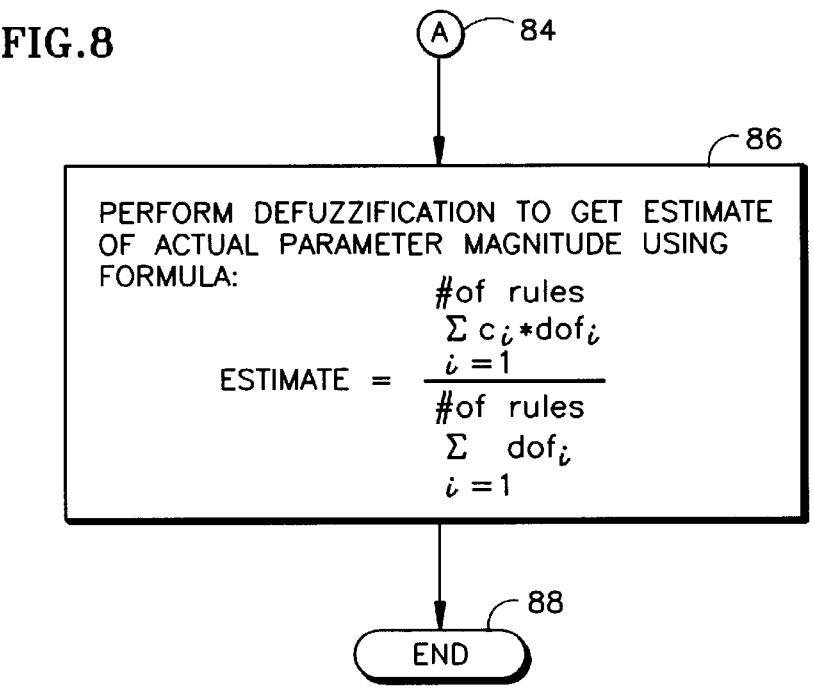

Referring now to FIG. 7, a simplified flowchart diagram 70 illustrates the step execution of the algorithm implemented by the estimator 35 within the engine control program. The algorithm begins at a step 72 labeled "START" and determines the absolute value of the differences between the input signal magnitudes at a step 74. The differences are fuzzified at step 76 to determine the fuzzy inputs. The next step 78 is to perform fuzzy inferencing to determine a degree of fulfillment for each rule in the rulebase. Values specified in the consequent portion of the rulebase are calculated at a step 80. A consequence array, c, is assigned values in accordance with the consequent portion of the rulebase at step 82. The algorithm continues on FIG. 8 at a step 84. At a step 86 the algorithm performs defuzzification to determine the estimate of the actual magnitude of the parameter corresponding to end of the algorithm (block 88).

Those skilled in the art will note that although the disclosed embodiment of the fuzzy logic section of the estimator is in programmed hardware, i.e. executed in software by a computer, it may take other forms, including hardwired hardware configurations, hardware manufactured in integrated circuit form, firmware, and combinations therein.

Figure 9:
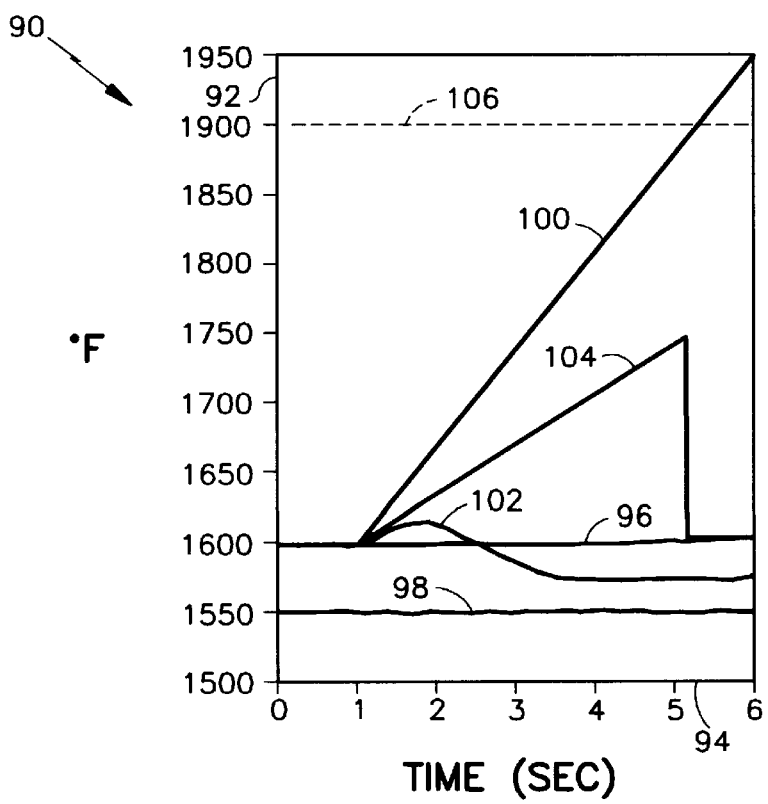
FIG. 9 is a graphical illustration of plots of S1, S2, and MODEL input signals for one possible failure scenario, and resulting estimate signals that may be provided with and without an estimator of FIG. 4.

Referring now to FIG. 9, to illustrate some of the possible benefits of the present invention, a graph 90 of indicated temperature magnitude (vertical axis 92) versus time (horizontal axis 94) shows a plot 96 of S1 having a magnitude indicative of 1600 deg F and a plot 98 of MODEL having a magnitude indicative of 1550 deg F. A plot 100 of S2 is indicative of a failure, having a starting magnitude indicative of 1600 deg F and an ending magnitude indicative of 1950 degrees. A plot 102 of an estimate signal 40 (FIGS. 2, 3, 4) provided by an estimator 35 (FIGS. 2, 3, 4) having the membership functions of FIG. 5 and the rulebase of FIG. 6 has a magnitude that initially indicates 1600 deg F, increases slightly as the magnitude indicated by S2 begins to increase, and then decreases gradually to indicate 1575 deg F. A plot 104 of a traditional estimate signal, i.e., produced without the present invention, has a magnitude that initially indicates 1600 deg F, steadily increases to indicate 1750 deg F as the magnitude of S2 increases, and decreases rapidly to indicate 1600 deg F when S2 reaches a fault threshold 106. It is assumed that the magnitude of the previous estimate signal is computed as the average of S1 and S2 until the fault is detected, and thereafter set equal to the magnitude of S1.

It is evident that the estimator in the best mode embodiment provides superior fault detection and accommodation compared to that of the traditional method. Thus the estimator may be used to minimize errors in the estimate and reduce transients upon accommodation. Reduced errors and transients present obvious benefits to the control system.

The fuzzy logic in the first embodiment (FIGS. 4–6) of the estimator can present considerable processing overhead to the system. Thus, the use of such an embodiment for real time processing within the engine control may necessitate the use of dedicated hardware and/or firmware to provide additional processing capability, such as a fuzzy logic processor. Fuzzy logic processors typically implement fuzzy logic functions, e.g., fuzzification, inferencing, defuzzification, in hardware, and are well known.

An alternative embodiment for the estimator comprises a mapping of an overall relationship between the inputs S1, S2, MODEL and the output ESTIMATE. The mapping may have any of various forms known to those skilled in the art, including but not limited to a look-up table (sometimes referred to as a "FAM" for fuzzy associative memory (see Kosko, B., 1992, Neural Networks and Fuzzy Systems, A Dynamical Systems Approach to Machine Intelligence, Prentice Hall, Englewood Cliffs, N.J., pp. 299–338.) or a "curve read") or a formula. Once generated, use of the mapping embodiment entails considerably less processing overhead than that required for the first embodiment.

The mapping is preferably generated "off-line" using an estimator such as that disclosed in the first embodiment. Different combinations of input magnitudes may be presented one combination at a time to the estimator. The different combinations should cover the sensor input range of interest, but typically need not cover every conceivable combination, for reasons detailed below. For each combination, the estimator produces an associated output. Each combination and its associated output together represent one data point in the overall input output relation. A large number of data points may be generated quickly and easily in this manner. The data points may be used to create a look-up table that provides, for each of a plurality of combinations of sensor input magnitudes, an associated output. Or, instead of a look-up table, the data points may be input to a statistical package to produce a formula for calculating the output based on the inputs. The formula can typically provide an appropriate output for any input combination in the sensor input range of interest, including combinations for which data points were not generated.

A look-up table embodiment may be responsive to absolute magnitudes or alternatively to relative differences (or some other parity space indication) between the sensor inputs. When accommodating parity space inputs, the output of the table would typically indicate the desired manner for determining the estimate, e.g. AVERAGE(S1, S2), or AVERAGE(S1, MODEL), etc. A look-up table embodiment may use interpolation to determine an appropriate output for any input combination not in the table.

The mapping embodiment provides all of the advantages of the first embodiment, but its use entails less processing overhead than that of the first embodiment. The mapping embodiment is preferably implemented in software but could also be implemented in hardware and/or firmware or any combination therein.

The estimator in the best mode embodiment is believed most beneficial with respect to parameters for which the real-time engine model provides an "independent" value. The model used in the best mode embodiment provides "independent" values for temperature and pressure parameters. However, due to features (state observer, Kalman Filtering) within the model, the model does not provide independent values for rotor speed parameters. This causes the MODEL signal value for these parameters to "track" the ESTIMATE signal value. To alleviate this, another real time model, without state observer features (i.e., an "untuned" model), may be incorporated into the digital engine control, to provide "independent" values for such parameters to the estimator.

While the estimator of the present invention is disclosed with respect to an embodiment for use with two real sensor signals and one analytical sensor signal, the present invention is not limited to such. The present invention may be used with any combination of real and analytical input sources so long as the total number of inputs is at least three.

Figure 10:
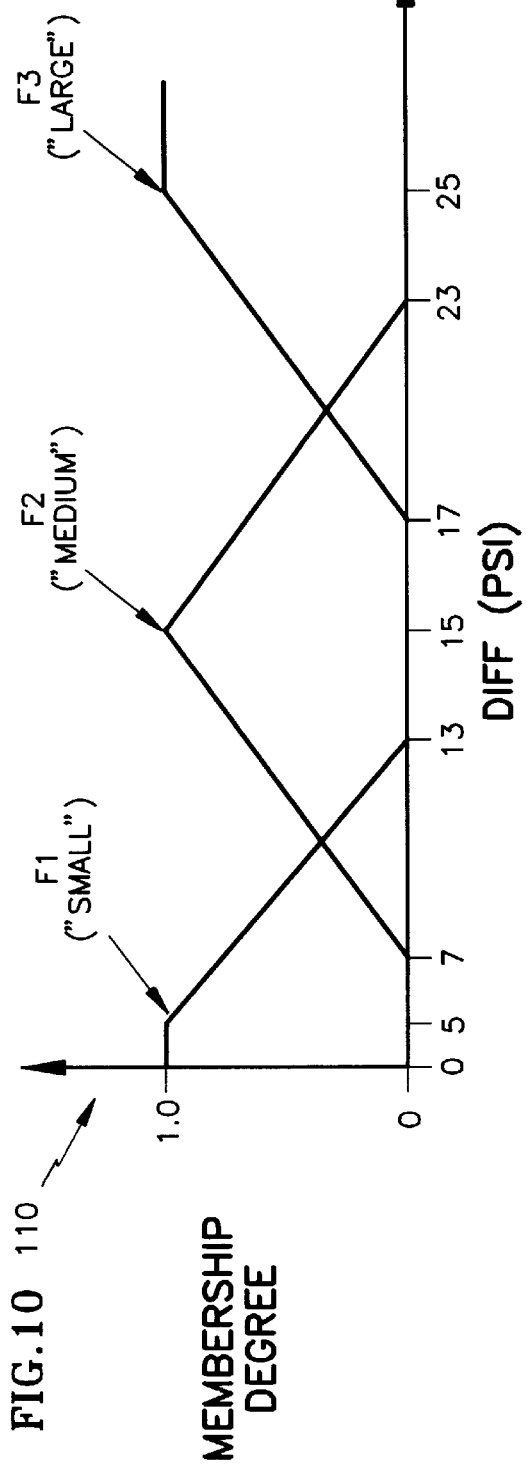
FIG. 10 is another graphical representation of fuzzy logic membership functions which may be used in estimator of FIG. 4.
Figure 11:
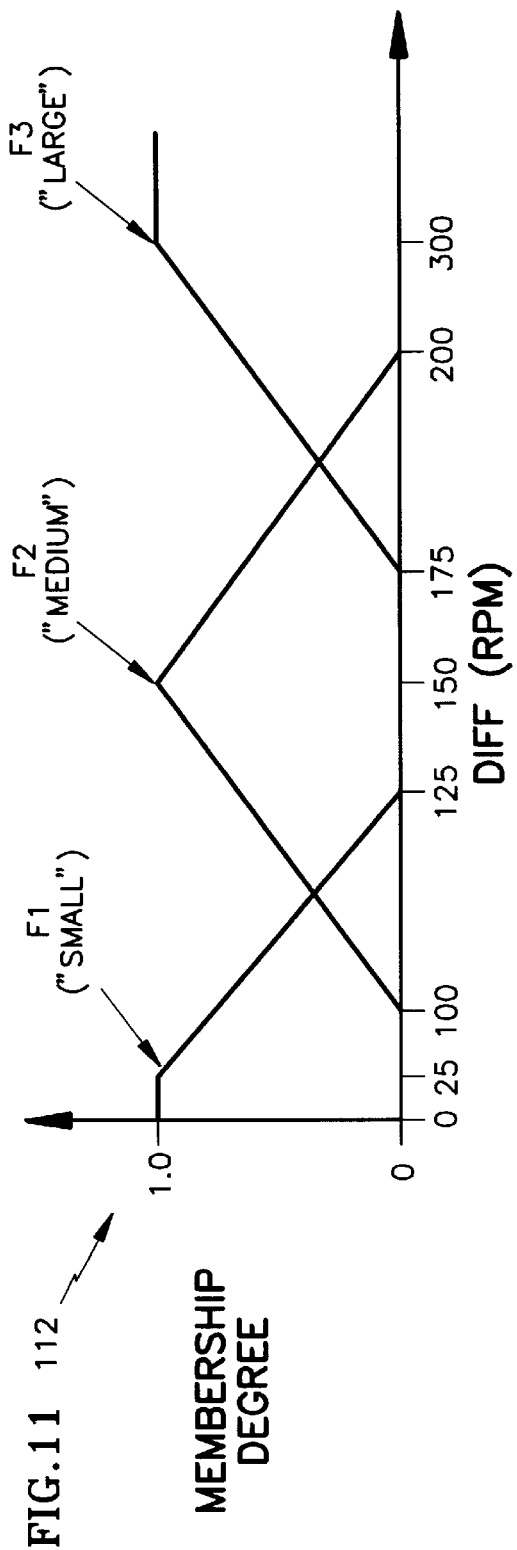
FIG. 11 is another graphical representation of fuzzy logic membership functions which may be used in estimator of FIG. 4.

Furthermore, although the estimator of the present invention is disclosed with respect to an embodiment that uses a set of three fry membership functions to fuzzify crisp inputs, any number of membership functions may be used. Using a set with more than three membership functions, e.g., four or five, could provide more granularity and facilitate better accommodation of particular input combinations. A unique set of membership functions may be provided for each crisp input. The membership functions need not receive inputs having engineering units. They may receive inputs of any type including but not limited to inputs which represent percentages and/or ratios. FIGS. 10 and 11 illustrate sets 110, 112 of exemplary fry membership functions for use with sensors measuring other physical parameters such as pressure and engine speed.

While the disclosed embodiment uses an exemplary rulebase, any suitable rulebase may be used. For example, the MODEL signal need not be treated differently than S1 and S2. The condition portions are not limited to AND operators and MINIMUM functions, for example, OR operators may be used along with a MAXIMUM function. Consequent portions are not limited to crisp values. If desirable, consequent portions may use median rather than mean or average. Using the mean has the advantage that it is statistically the closest approximation to the "true" value of the sensed parameter when all three sensors are functioning properly. The mean, however is corrupted when a sensor is faulty, but has not yet been detected and isolated. The median is normally quite close to the mean and has the advantage that it is not corrupted when one sensor drifts or provides erratic readings.

Although the disclosed embodiment defuzzifies using a degree of fulfillment weighted average of the rulebase consequent portions, any suitable method may be used. Such other methods may be necessary if the consequent portions of the rulebase are not crisp numbers.

Although the best mode embodiment of the present invention has a differencer preceding the fry logic section, the invention is not limited to such. In one alternative the differencer may be embodied within the fuzzy logic section. For example, the fuzzy logic section may fuzzify the S1, S2 and MODEL signals, and difference determinations may then be performed on the fry representations. In such instance the differencer may be considered to have a fuzzifier while the evaluator may be considered to have a fuzzy inferencer but not a fuzzifier. Of course, such an embodiment would require a different set of membership functions and/or fuzzy rulebase.

It should also be understood that the film logic concepts of the present invention could be embodied in a trained neural network, the basic concepts of which are well known in the art, with minimal adaptation of the present invention.

While the particular invention has been described with reference to particular embodiments, this description is not meant to be construed in a limiting sense. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An apparatus for use in estimating an actual magnitude of a physical parameter, where at least three redundant signals are input to the apparatus, each input signal is indicative of a sensed magnitude of the parameter, the apparatus comprising:
    a differencer providing in response to the at least three redundant input signals at least three difference signals indicative of the relative differences between the sensed magnitudes;
    an evaluator for computing in response to said at least three difference signals, a plurality of evaluation signals; and
    a synthesizer for generating in response to said evaluation signals, an estimate signal indicative of an estimate of the actual magnitude of the physical parameter,
    wherein said estimate signal has a magnitude indicative of a summation of the product of the magnitude indicated by each redundant input signal and an associated proportionality factor, wherein each proportionality factor has a value equal to one of a plurality of possible values for that proportionality factor, the value of each proportionality factor depending upon said magnitudes of said difference signals.

2. The apparatus of claim 1 wherein said possible values of said proportionality factors ranges from substantially zero to substantially unity.

3. The apparatus of claim 1 wherein said possible values of said proportionality factors comprises a generally continuous set of values.

4. The apparatus of claim 1 wherein each of said difference signals has a magnitude proportional to the difference between the sensed magnitudes indicated by two of the redundant input signals.

5. The apparatus of claim 1 wherein said estimate signal has a magnitude that is described by a smoothly varying function.

6. The apparatus as in claim 1 wherein said evaluation signals are of a type indicative of weighting factors and said estimate signal has a magnitude indicative of a weighted average based on said weighting factors.

7. The apparatus as in claim 6 wherein said evaluator further receives the redundant input signals and provides in response to the redundant input signals a plurality of signals each indicative of a possible estimate of the actual magnitude of the physical parameter, and wherein said synthesizer receives said plurality of signals and provides said estimate signal which is indicative of a weighted average of said plurality of signals.

8. An apparatus for use in estimating an actual magnitude of a physical parameter, where at least three redundant signals are input to the apparatus, each input signal is indicative of a sensed magnitude of the parameter, the apparatus comprising:
    a differencer providing in response to the at least three redundant input signals at least three difference signals indicative of the relative differences between the sensed magnitudes;
    an evaluator for computing a plurality of evaluation signals in response to an input of said at least three difference signals and the at least three redundant input signals,
    wherein said evaluation provides said evaluation signals that are representative of fuzzy logic signals; and
    a synthesizer for generating in response to said evaluation signals, an estimate signal indicative of an estimate of the actual magnitude of the physical parameter.

9. The apparatus of claim 8 wherein said evaluator comprises a fuzzy inferencer having a rulebase with a plurality of rules, each of said rules having a condition portion and a consequent portion, and wherein said consequent portion are of a crisp type.

10. The apparatus of claim 9 wherein said evaluation signals each have a degree of fulfillment portion indicative of a degree of fulfillment for said condition portion of an associated one of said rules and a consequent portion indicative of said consequent portion of said associated rule, and wherein said synthesizer provides said estimate signal at a magnitude which is indicative of a degree of fulfillment weighted average of said consequent portion of said evaluation signals.

11. The apparatus of claim 10 wherein said difference signals are of representative of a crisp type and wherein said evaluator further comprises a fuzzifier responsive to said difference signals and having at least one set of fuzzy membership functions for providing fuzzy logic signals indicative of said difference signals to said fuzzy inferencer for use in determining said degree of fulfillment of said condition portions of said rules in said fuzzy rulebase.

12. A method for use in estimating an actual magnitude of a physical parameter, using at least three redundant input signals, each input signal is indicative of a sensed magnitude of the parameter, the method comprising:
    providing in response to the at least three redundant input signals at least three difference signals indicative of the relative differences between the sensed magnitudes;
    computing in response to said at least three difference signals, a plurality of evaluation signals; and
    generating in response to said evaluation signals, an estimate signal indicative of an estimate of the actual magnitude of the physical parameter,
    wherein said estimate signal has a magnitude indicative of a summation of the product of the magnitude indicated by each redundant input signal and an associated proportionality factor, wherein each proportionality factor has a value equal to one of a plurality of possible values for that proportionality factor, the value of each proportionality factor depending upon said magnitudes of said difference signals.

13. The method of claim 12 wherein said possible values of said proportionality factors ranges from substantially zero to substantially unity.

14. The method of claim 12 wherein said possible values of said proportionality factors comprises a generally continuous set of values.

15. The method of claim 12 wherein each of said difference signals has a magnitude proportional to the difference between the sensed magnitudes indicated by two of the redundant input signals.

16. The method of claim 12 wherein said estimate signal has a magnitude that is described as a smoothly varying function.

17. The method of claim 12 wherein said evaluation signals are of a type indicative of weighting factors and said estimate signal has a magnitude indicative of a weighted average based on said weighting factors.

18. The method as in claim 17 further comprising the step of providing a plurality of signals each indicative of a possible estimate of the actual magnitude of the physical parameter, and wherein said estimate signal is indicative of a weighted average of said plurality of signals.

19. A method for use in estimating an actual magnitude of a physical parameter at least three redundant input signals, each input signal is indicative of a sensed magnitude of the parameter, the method comprising:

providing in response to the at least three redundant input signals at least three difference signals indicative of the relative differences between the sensed magnitudes; computing a plurality of evaluation signals using said at least three difference signals and the at least three redundant input signals, wherein said computing step comprises a fuzzifying step for providing said evaluation signals as representative of fuzzy logic signals; and generating in response to said evaluation signals, an estimate signal indicative of an estimate of the actual magnitude of the physical parameter.

20. The method of claim 19 wherein said computing step further comprises the step of fuzzy inferencing including providing a fuzzy rulebase with a plurality of rules, each of said rules having a condition portion and a consequent portion, wherein said consequent portion is of a crisp type.

21. The method of claim 20 wherein said evaluation signals each have a degree of fulfillment portion indicative of a degree of fulfillment for said condition portion of an associated one of said rules and a consequent portion indicative of said consequent portion of said associated rule, and wherein said estimate signal has a magnitude which is indicative of a degree of fulfillment weighted average of said consequent portion of said evaluation signals.

22. The method of claim 19 wherein said difference signals are representative of a crisp type and wherein said step of computing further comprises the step of fuzzifying including providing at least one set of fuzzy membership functions and evaluating said fuzzy membership functions with respect to said difference signals to produce representing said difference signals but of a type comprising fuzzy logic; and wherein said step of fuzzy inferencing further comprises the step of determining in response to said fuzzy logic signals a degree of fulfillment for each of said condition portions of said rules in said fry rulebase.

23. An engine control system for use in operating a gas turbine engine, said system comprising:

a sensor array of at least three sensors for providing at least three redundant input signals corresponding to the value of an engine parameter; and estimator apparatus having means for providing, in response to the at least three redundant input signals at least three difference signals indicative of the relative differences between the respective sensor signal values;

means for computing a plurality of evaluation signals in response to said at least three difference signals; and means for generating an estimate signal in response to said evaluation signals indicative of an estimate of the actual magnitude of the parameter, wherein said estimate signal has a magnitude indicative of a summation of the product of the magnitude indicated by each redundant input signal and an associated proportionality factor, wherein each proportionality factor has a value equal to one of a plurality of possible values for that proportionality factor, the value of each proportionality factor depending upon said magnitudes of said difference signals.

24. The system of claim 23 wherein said possible values of said proportionality factors ranges from substantially zero to substantially unity.

25. The system of claim 23 wherein said possible values of said proportionality factors comprises a generally continuous set of values.

26. The system of claim 23 wherein each of said difference signals has a magnitude proportional to the difference between the sensed magnitudes indicated by two of the redundant input signals.

27. The system of claim 23 wherein said estimate signal has a magnitude that is described by a smoothly varying function.

28. The system as in claim 23 wherein said evaluation signals are of a type indicative of weighting factors and said estimate signal has a magnitude indicative of a weighted average based on said weighting factors.

29. The system as in claim 28 wherein said means for computing further receives the redundant input signals and provides in response to the redundant input signals a plurality of signals each indicative of a possible estimate of the actual magnitude of the physical parameter, and wherein said means for generating receives said plurality of signals and provides said estimate signal which is indicative of a weighted average of said plurality of signals.

30. An engine control system for use in operating a gas turbine engine, said system comprising:

a sensor array of at least three sensors for providing at least three redundant input signals corresponding to the value of an engine parameter; and estimator apparatus having means for providing, in response to the at least three redundant input signals at least three difference signals indicative of the relative differences between the respective sensor signal values;

means for computing a plurality of evaluation signals in response to an input of said at least three difference signals and the at least three redundant input signals, wherein said means for computing fuzzifies said evaluation signals as representative of fuzzy logic signals; and means for generating an estimate signal in response to said evaluation signals indicative of an estimate of the actual magnitude of the parameter.

31. The system of claim 30 wherein said means for computing comprises a fuzzy inferencer having a rulebase with a plurality of rules, each of said rules having a condition portion and a consequent portion, and wherein said consequent portion are of a crisp type.

32. The system of claim 31 wherein said evaluation signals each have a degree of fulfillment portion indicative of a degree of fulfillment for said condition portion of an associated one of said rules and a consequent portion indicative of said consequent portion of said associated rule, and wherein said means for generating provides said estimate signal at a magnitude which is indicative of a degree of fulfillment weighted average of said consequent portion of said evaluation signals.

33. The system of claim 32 wherein said difference signals are of representative of a crisp type and wherein said means for computing further comprises a fuzzifier responsive to said difference signals and having at least one set of fuzzy membership functions for providing fuzzy logic signals indicative of said difference signals to said fuzzy inferencer for use in determining said degree of fulfillment of said condition portions of said rules in said fuzzy rulebase.

34. The system of claim 23 further comprising a memory section wherein said estimate signals are stored in said memory section.

35. The system of claim 23 wherein one of said sensors comprises an analytical sensor presenting signals corresponding to a modeled value of said engine parameter.

36. The system of claim 35 wherein the sensed magnitude indicated by the input signal provided by the analytical sensor is not used in calculating the estimate unless there is disagreement between the sensed magnitudes indicated by the other input signals provided by the other sensors.

* * * * *